(12) United States Patent
Kihara et al.

(10) Patent No.: US 10,855,571 B2
(45) Date of Patent: Dec. 1, 2020

(54) MEASUREMENT DEVICE AND MEASUREMENT METHOD

(71) Applicant: ANRITSU CORPORATION, Kanagawa (JP)

(72) Inventors: Yoshitaka Kihara, Kanagawa (JP); Takahiro Kasagi, Kanagawa (JP); Custodio Jean-Elaine Garcia, Kanagawa (JP); Yuichi Tsuiki, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 0 days.

(21) Appl. No.: 16/275,743

(22) Filed: Feb. 14, 2019

(65) Prior Publication Data
US 2019/0306046 A1 Oct. 3, 2019

(30) Foreign Application Priority Data

Mar. 27, 2018 (JP) .................................. 2018-059905

(51) Int. Cl.
*H04L 12/26* (2006.01)
*H04L 1/00* (2006.01)
(52) U.S. Cl.
CPC ............ *H04L 43/50* (2013.01); *H04L 1/0009* (2013.01)
(58) Field of Classification Search
CPC ................................ H04W 24/06; H04L 43/50
See application file for complete search history.

(56) References Cited

U.S. PATENT DOCUMENTS

| | | | | |
|---|---|---|---|---|
| 2008/0020746 A1* | 1/2008 | Alexandar | ............ | H04W 24/06 455/423 |
| 2009/0109867 A1* | 4/2009 | Mangetsu | ............... | H04L 43/50 370/252 |
| 2011/0103235 A1* | 5/2011 | Luong | ..................... | H04L 43/18 370/245 |
| 2011/0243081 A1* | 10/2011 | Liu | ......................... | H04W 4/08 370/329 |
| 2012/0113829 A1* | 5/2012 | Olgaard | .................... | H04L 1/24 370/252 |

(Continued)

FOREIGN PATENT DOCUMENTS

JP 2016-082245 A 5/2016

*Primary Examiner* — Wen W Huang
(74) *Attorney, Agent, or Firm* — Pearne & Gordon LLP

(57) ABSTRACT

A measurement device and a measurement method capable of performing measurement on a device under test while maintaining a desired high data rate even under poor communication conditions such as occurrence of retransmission of a frame from a device under test in a wireless communication connection are provided. The measurement device includes a reception unit 14 that receives a frame transmitted from a DUT 1, a determination unit 16 that determines whether or not a header of the frame has been normally received by the reception unit 14, an acknowledgment transmission unit 13*b* that transmits the acknowledgment frame to the DUT 1 when the determination unit 16 determines that the header has been normally received by the reception unit 14; and a measurement unit 17 that performs the measurement on the frame determined by the determination unit 16 that the header has been normally received by the reception unit 14.

8 Claims, 8 Drawing Sheets

(56) References Cited

U.S. PATENT DOCUMENTS

| | | | |
|---|---|---|---|
| 2014/0112121 A1* | 4/2014 | Lee | H04L 1/0009 370/216 |
| 2014/0169195 A1* | 6/2014 | Hsin | H04W 24/06 370/252 |
| 2015/0092697 A1* | 4/2015 | Yeow | H04L 1/0025 370/329 |
| 2015/0229435 A1* | 8/2015 | Kalyani | H04L 1/0009 370/329 |
| 2015/0249529 A1* | 9/2015 | Zheng | H04L 1/1685 370/336 |

* cited by examiner

| HT MCS Index | Modulation scheme | Coding rate |
|---|---|---|
| 0 | BPSK | 1/2 |
| 1 | QPSK | 1/2 |
| 2 | QPSK | 3/4 |
| 3 | 16-QAM | 1/2 |
| 4 | 16-QAM | 3/4 |
| 5 | 64-QAM | 2/3 |
| 6 | 64-QAM | 3/4 |
| 7 | 64-QAM | 5/6 |

FIG. 2

| VHT MCS Index | Modulation scheme | Coding rate |
|---|---|---|
| 0 | BPSK | 1/2 |
| 1 | QPSK | 1/2 |
| 2 | QPSK | 3/4 |
| 3 | 16-QAM | 1/2 |
| 4 | 16-QAM | 3/4 |
| 5 | 64-QAM | 2/3 |
| 6 | 64-QAM | 3/4 |
| 7 | 64-QAM | 5/6 |
| 8 | 256-QAM | 3/4 |
| 9 | 256-QAM | 5/6 |

FIG. 3

MEASUREMENT DEVICE AND MEASUREMENT METHOD

TECHNICAL FIELD

The present invention relates to a measurement device and a measurement method for performing measurement on a device under test that operates on the basis of, for example, a wireless LAN (Local Area Network) communication standard.

BACKGROUND ART

With the development of an information communication technology, various wireless communication technologies have been developed. For example, IEEE (Institute of Electrical and Electronics Engineers) 802.11n is known as a communication standard regarding a wireless LAN technology among the technologies. In this IEEE 802.11n, a multiple inputs and multiplexed outputs (MIMO) technology in which multiplex antennas are used on both a transmitting side and a receiving side in order to support a high throughput (HT) with a data processing speed of 540 Mbps or more, minimize a transmission error, and optimize a data rate has been introduced.

In recent years, widespread use of the wireless LAN has been activated, and a new wireless LAN system for supporting a processing rate higher than a data processing speed supported by IEEE 802.11n is required, and a next generation wireless LAN system has been proposed as a next version of a IEEE 802.11n wireless LAN system. For example, IEEE 802.11ac is a new communication standard developed to support very high throughput (VHT).

In a communication standard such as IEEE 802.11n or IEEE 802.11ac, a combination of a modulation scheme and a coding rate can be selected using a modulation and coding scheme (MCS) in transmission of a data stream of a wireless LAN.

In a wireless LAN system, when a wireless device that is a transmission destination receives a frame transmitted from a wireless communication device that is a transmission source, the wireless device that is a transmission destination transmits an acknowledgment (ACK) frame to the wireless communication device that is a transmission source in a case where the wireless device can receive the entire frame without an error (see, for example, Patent Document 1). When the wireless communication device that is a transmission source cannot receive the ACK frame, the wireless communication device retransmits the frame. In this case, it is common to lower a data rate of the frame in order to increase a delivery probability of the frame.

RELATED ART DOCUMENT

Patent Document

[Patent Document 1] JP-A-2016-82245

DISCLOSURE OF THE INVENTION

Problem that the Invention is to Solve

Incidentally, an example of a measurement device that sets a wireless communication device as disclosed in Patent Document 1 as a device under test and performs measurement includes a measurement device that causes a device under test to generate and transmit data in any modulation scheme or coding rate desired by a user, analyzes the data, and thereby measures characteristics of the device under test in any modulation scheme or coding rate. A data rate of a frame is determined by a combination of a modulation scheme and a coding rate.

However, when the measurement device performs the measurement on a frame at a high data rate from the device under test, there is a problem that a reception error occurs when a reception environment of the measurement device is bad, and a high data rate cannot be maintained due to frequent retransmission of the frame from the device under test.

Here, "when a reception environment of the measurement device is bad" means, for example, a situation in which transmission power of the device under test is constant, but power reaching a reception side of the measurement device is not constant since radiated power does not become constant in all directions and an intensity of the radiated power is changed according to the direction in a test (an OTA (Over The Air) test or a TRP (Total Radiated Power) measurement/TIS (Total Isotropic Sensitivity) measurement) regarding antenna directivity of the device under test. In such a case, an amplifier may be used as a subsidiary on the reception side of the measurement device, but this is not a complete countermeasure from the viewpoint of an SNR (Signal to Noise Ratio), and as a result, demodulation cannot be performed on the reception side of the measurement device.

The present invention has been made to solve such problems of the related art, and an object of the present invention is to provide a measurement device and a measurement method capable of performing measurement on a device under test while maintaining a desired high data rate even under poor communication conditions such as occurrence of retransmission of a frame from a device under test in a wireless communication connection.

Means for Solving the Problem

In order to solve the above problem, a measurement device according to the present invention is a measurement device which includes a reception unit that receives a frame or a changed frame transmitted by a device under test and a measurement unit that performs measurement on the frame or the changed frame received by the reception unit, the device under test retransmitting a frame in which at least one of predetermined modulation scheme and predetermined coding rate has been changed so that a data rate is lower than that of a frame generated using the modulation scheme and the predetermined coding rate, in order to measure the device under test when an acknowledgment frame indicating that a predetermined transmission destination has received the frame has not been received after the frame is transmitted to the transmission destination, the device including: a determination unit that determines whether or not a header of the frame or the changed frame has been normally received by the reception unit; and an acknowledgment transmission unit that transmits the acknowledgment frame to the device under test when the determination unit determines that the header has been normally received by the reception unit, wherein the measurement unit performs the measurement on the frame or the changed frame determined by the determination unit that the header has been normally received by the reception unit.

In a frame of the wireless LAN, a header portion in a first half is configured with a low data rate, and a data portion in a second half is configured with a high data rate. Therefore, even in an environment in which the data portion with a high data rate cannot be received, only the header portion can be received in some cases. Since the measurement device according to the present invention transmits the acknowledgement frame to the device under test when the header can be normally received even under poor communication conditions such as occurrence of retransmission of a frame from the device under test in the wireless communication connection, it is possible to perform measurement for the device under test while maintaining a desired high data rate.

Further, a measurement device according to the present invention is a measurement device for measuring a device under test retransmitting a frame of which a modulation and coding scheme index in which a modulation scheme and a coding rate are associated with each other has been changed so that a data rate is lower than that of a frame generated on the basis of the modulation and coding scheme index when an acknowledgment frame indicating that the frame has been received by a predetermined transmission destination has not been received after the frame is transmitted to the transmission destination according to a frame request signal, the device further comprising: a comparison unit that compares the modulation and coding scheme index included in the header determined by the determination unit to have been normally received by the reception unit with a predetermined value, wherein the acknowledgment transmission unit transmits the acknowledgment frame to the device under test when the comparison unit determines that the modulation and coding scheme index is equal to or less than a predetermined value, and does not transmit the acknowledgment frame to the device under test when the comparison unit does not determine that the modulation and coding scheme index is equal to or less than the predetermined value, the request signal transmission unit transmits the frame request signal to the device under test when it is determined by the comparison unit that the modulation and coding scheme index is less than the predetermined value, and the measurement unit performs the measurement on the frame or the changed frame determined by the comparison unit that the modulation and coding scheme index matches the predetermined value.

With this configuration, since the measurement device according to the present invention transmits the acknowledgement frame to the device under test according to a comparison result of the comparison unit when the header can be normally received even under poor communication conditions such as occurrence of retransmission of a frame from the device under test in the wireless communication connection, it is possible to perform measurement for the device under test while maintaining a desired high data rate.

Further, in the measurement device according to the present invention, the reception unit may receive, as the frame or the changed frame, a response frame that the device under test transmits according to a ping command.

Here, the "ping" is an ICMP (Internet Control Message Protocol) Echo Request (a response is an ICMP Echo Reply).

With this configuration, when the reception unit has received a response frame that the device under test transmits in response to the ping command, the measurement device according to the present invention can perform the measurement on the response frame.

Further, in the measurement device according to the present invention, the reception unit may receive a frame conforming to the IEEE 802.11 standard as the frame or the changed frame.

With this configuration, when the reception unit has received the frame conforming to the IEEE 802.11 standard, the measurement device according to the present invention can perform the measurement on the frame conforming to the IEEE 802.11 standard.

Further, in the measurement device according to the present invention, the measurement unit may measure transmission characteristics of the device under test.

With this configuration, the measurement device according to the present invention can measure the transmission characteristics of the device under test using the measurement unit.

Further, a measurement method according to the present invention a measurement method of performing measurement on the device under test using the measurement device, the method including: a determination step of determining whether or not a header of the frame or the changed frame transmitted by the device under test has been normally received by the reception unit; an acknowledgment transmission step of transmitting the acknowledgment frame to the device under test when it is determined in the determination step that the header has been normally received by the reception unit; and a measurement step of performing the measurement on the frame or the changed frame determined in the determination step that the header has been normally received by the reception unit.

With this configuration, since the measurement device according the present invention transmits the acknowledgement frame to the device under test when the header can be normally received even under poor communication conditions such as occurrence of retransmission of a frame from the device under test in the wireless communication connection, it is possible to perform measurement for the device under test while maintaining a desired high data rate.

Further, a measurement method according to the present invention is a measurement method of performing measurement on the device under test using the measurement device, the method including: a determination step of determining whether or not a header of the frame or the changed frame transmitted by the device under test has been normally received by the reception unit; a comparison step of comparing the modulation and coding scheme index included in the header determined in the determination step to have been normally received by the reception unit with a predetermined value; an acknowledgment transmission step of transmitting the acknowledgment frame to the device under test when it is determined in the comparison step that the modulation and coding scheme index is equal to or less than a predetermined value, and not transmitting the acknowledgment frame to the device under test when it is not determined in the comparison step that the modulation and coding scheme index is equal to or less than the predetermined value; a request signal transmission step of transmitting the frame request signal to the device under test when it is determined in the comparison step that the modulation and coding scheme index is less than the predetermined value; and a measurement step of performing the measurement on the frame or the changed frame determined in the comparison step that the modulation and coding scheme index matches the predetermined value.

With this configuration, since the measurement method according the present invention transmits the acknowledgement frame to the device under test according to a comparison result of the comparison unit when the header can be normally received even under poor communication conditions such as occurrence of retransmission of a frame from the device under test in the wireless communication connection, it is possible to perform measurement for the device under test while maintaining a desired high data rate.

Further, in the measurement method according to the present invention, the reception unit may receive, as the frame or the changed frame, a response frame that the device under test transmits according to a ping command.

Further, in the measurement method according to the present invention, a frame conforming to the IEEE 802.11 standard may be received as the frame or the changed frame.

Further, in the measurement method according to the present invention, transmission characteristics of the device under test may be measured.

Advantage of the Invention

The present invention provides a measurement device and a measurement method capable of performing measurement on a device under test while maintaining a desired high data rate even under poor communication conditions such as occurrence of retransmission of a frame from a device under test in a wireless communication connection.

BRIEF DESCRIPTION OF THE DRAWINGS

FIG. 2 is a table showing MCS in a single stream in the IEEE 802.11n communication standard.

FIG. 3 is a table showing MCS in the IEEE 802.11ac communication standard.

BEST MODE FOR CARRYING OUT THE INVENTION

Hereinafter, embodiments of a measurement device and a measurement method according to the present invention will be described with reference to the drawings.

First Embodiment

Figure 1:
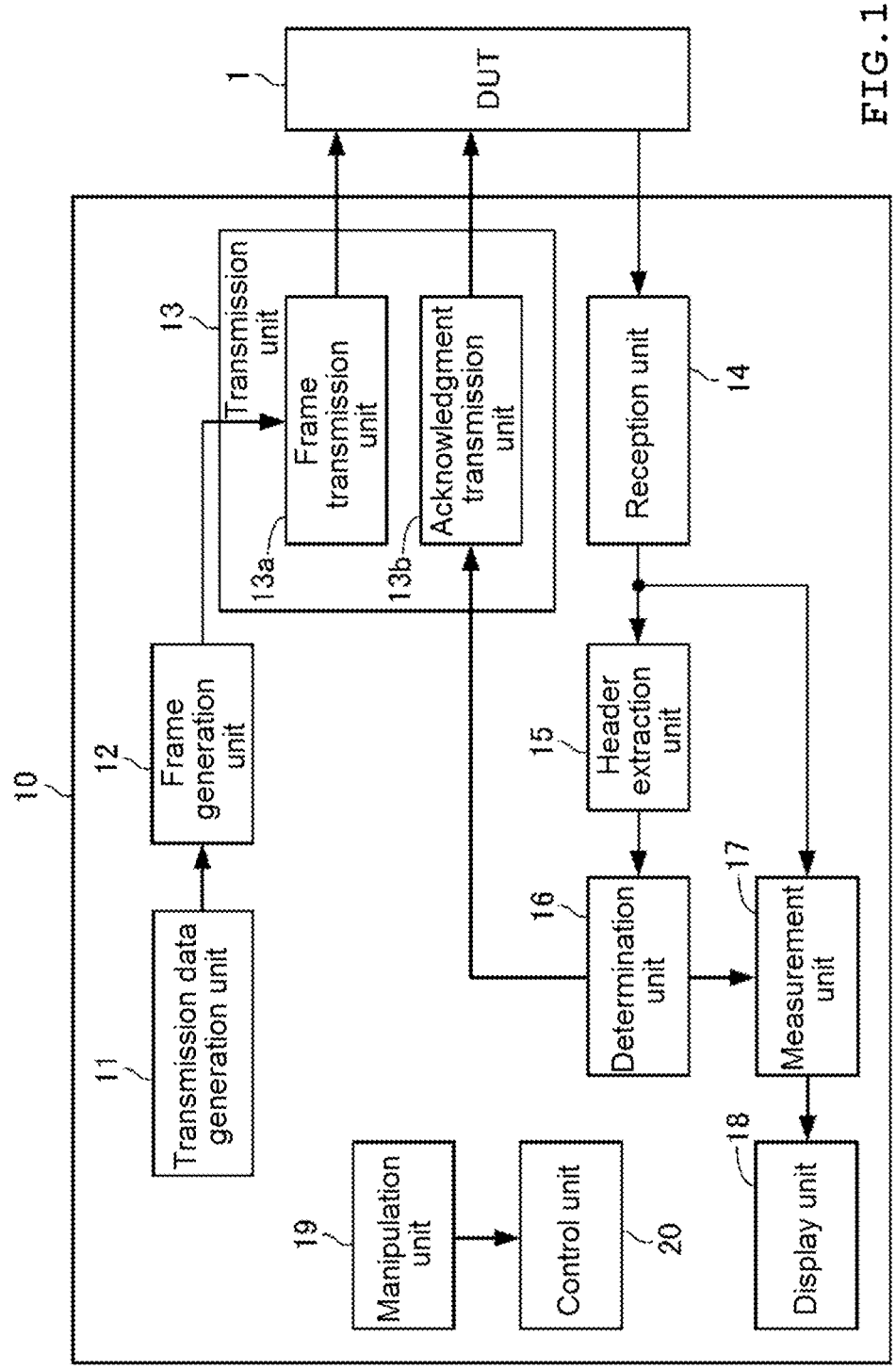
FIG. 1 is a block diagram illustrating a configuration of a measurement device according to a first embodiment of the present invention.

As illustrated in FIG. 1, a measurement device 10 according to a first embodiment of the present invention performs wireless communication with a DUT 1 that is a device under test and performs measurement on the DUT 1. In the first embodiment, it is assumed that the measurement device 10 operates as a wireless LAN master (AP: Access Point) and the DUT 1 operates as a wireless LAN slave (STA: STAtion), but the present invention is not limited thereto. The measurement device 10 may operate as a wireless LAN slave, and the DUT 1 may operate as a wireless LAN master.

It is assumed that the measurement device 10 communicates with the DUT 1 on the basis of a communication standard conforming to any one of IEEE 802.11a/b/g/n/ac.

As already described, in a communication standard such as the IEEE 802.11n (hereinafter also referred to as HT) or the IEEE 802.11ac (hereinafter also referred to as VHT), a combination of a modulation scheme, a coding rate, and the like can be selected using MCS.

FIG. 2 illustrates eight types of MCSs for a single stream of which the number of spatial streams is one among 77 types of MCSs that can be set in HT. As illustrated in FIG. 2, a specification such that a combination of a desired modulation scheme and a desired coding rate is determined for each MCS index, and a delivery probability increases as the MCS index decreases.

FIG. 3 illustrates ten types of MCSs for each spatial stream that can be set in VHT. As illustrated in FIG. 3, the delivery probability increases as the MCS index decreases.

When the DUT 1 does not receive an acknowledgment frame (an ACK frame) indicating that a frame generated using a predetermined modulation scheme and a predetermined coding rate has been received by the measurement device 10 after the DUT 1 transmits the frame to the measurement device 10 that is a transmission destination, the DUT 1 retransmits a frame of which a data rate is lowered so that the probability of delivery to the measurement device 10 increases. The data rate of the frame changes as at least one of the modulation scheme and the coding rate is changed.

Alternatively, when the DUT 1 does not receive an ACK frame indicating that a frame generated on the basis of the MCS index with which the modulation scheme and the coding rate are associated has been received by the measurement device 10 after the DUT 1 transmits the frame to the measurement device 10 that is a transmission destination according to the frame request signal, the DUT 1 retransmits a frame of which a data rate is lowered so that the probability of delivery to the measurement device 10 increases. The data rate of the frame changes as the NCS index changes.

For example, the DUT 1 performs an operation of retransmitting a frame with a decreased MCS index when an ACK frame for a transmission frame with a certain MCS index has not been received, and retransmitting a frame with a further decreased MCS index when an ACK frame for the retransmitted frame has not also been received.

Further, the DUT 1 performs an operation of retransmitting the frame with the increased MCS index when the DUT 1 has received a frame request signal requesting a new frame after the DUT 1 has received the ACK frame for the transmission frame with the certain MCS index.

The frame to be transmitted and received between the DUT 1 and the measurement device 10 includes a header and a data portion, and information on the MCS index is included in the header. For example, there are three types of frame formats in the HT, and there is one type of frame format in the VHT, as illustrated in FIGS. 4A and 4B.

Figure 4:
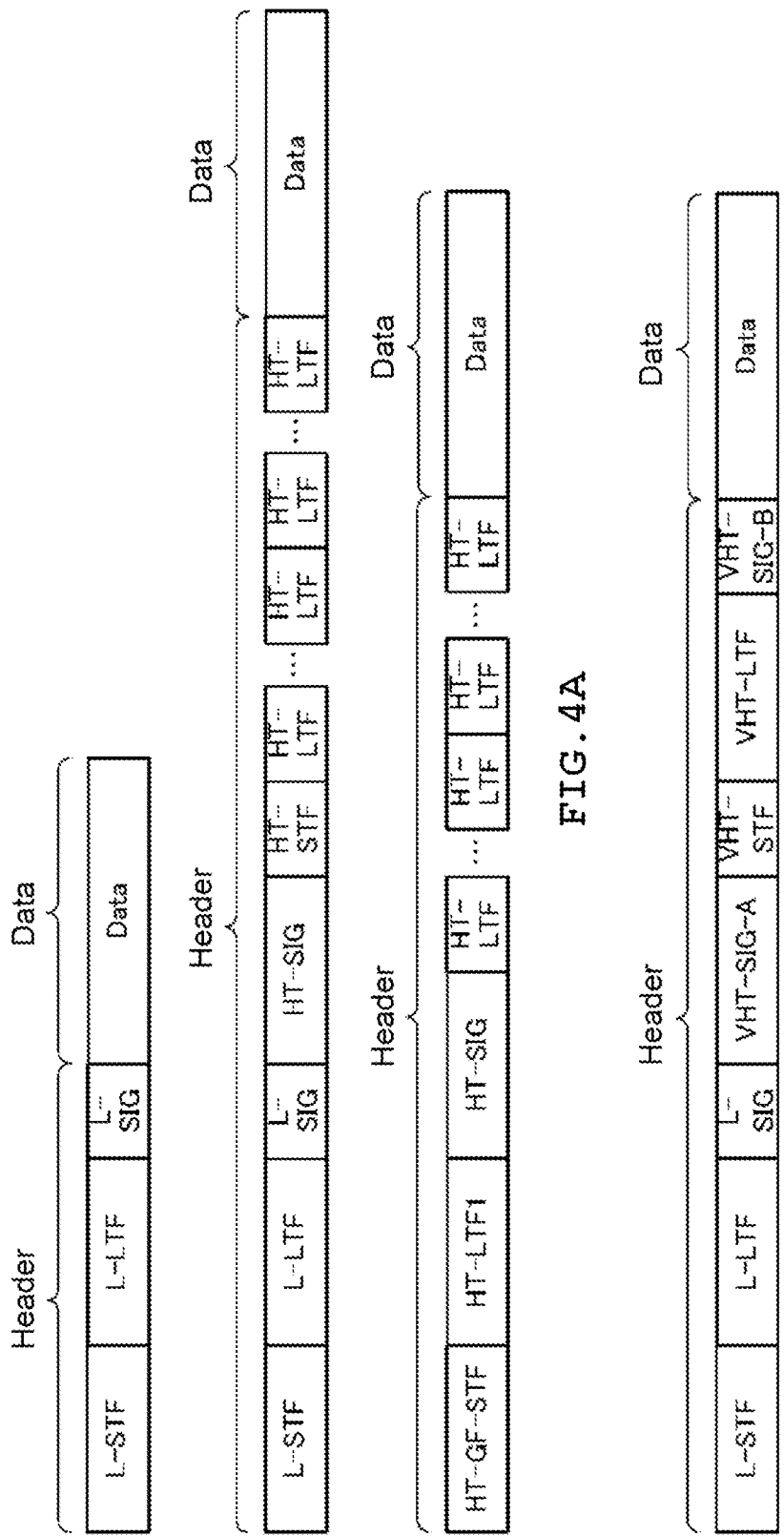
FIG. 4A is a diagram illustrating a frame format of an HT.
FIG. 4B is a diagram illustrating a frame format of a VHT.

More specifically, in the HT illustrated in FIG. 4A, the information on the MCS index is included in "L-SIG" of a header of an upper frame format, "HT-SIG" of a header of a middle frame format, and "HT-SIG" of a header of a lower frame format. Further, in the VHT illustrated in FIG. 4B, information on the MCS index is included in "VHT-SIG-A" and "VHT-SIG-B" of a header of the frame format.

As illustrated in FIG. 1, a measurement device 10 of the first embodiment includes a transmission data generation unit 11, a frame generation unit 12, a transmission unit 13, a reception unit 14, a header extraction unit 15, a determination unit 16, a measurement unit 17, a display unit 18, a manipulation unit 19, and a control unit 20.

The transmission data generation unit 11 generates transmission data set by a user and outputs the transmission data to the frame generation unit 12.

The frame generation unit 12 generates (constitutes) a frame including the data output from the transmission data generation unit 11, and outputs the frame to the transmission unit 13.

The transmission unit 13 and the reception unit 14 establish a wireless communication connection to the DUT 1 on the basis of a communication standard conforming to any one of the IEEE 802.11a/b/g/n/ac. In addition, the transmission unit 13 and the reception unit 14 transmit and receive various pieces of data regarding the measurement to and from the DUT 1 after the wireless communication connection has been established.

The reception unit 14 includes, for example, a reception antenna, a down converter, an analog-to-digital converter (ADC), a demodulation circuit, and a decoding processing circuit. The reception unit 14 receives a frame transmitted from the DUT 1 and outputs the frame to the header extraction unit 15 and the measurement unit 17.

In the frame of the wireless LAN as illustrated in FIGS. 4A and 4B, a header portion in a first half is configured with a low data rate, and a data portion in a second half is configured with a high data rate. Therefore, even in a reception environment in which a reception error occurs when the reception unit 14 receives the data portion with a high data rate, only the header portion can be received in some cases.

Therefore, the header extraction unit 15 extracts data of the header from the frame received by the reception unit 14.

The determination unit 16 determines whether or not the data of the header extracted by the header extraction unit 15 is normal. That is, the determination unit 16 determines whether or not the header of the frame has been normally received by the reception unit 14. When it is determined whether or not the received header is normal, the received header is determined to be normal when there is no error in a cyclic redundancy check (CRC) which is a type of error detection code since the CRC is added to the header itself. Further, the determination of the determination unit 16 is performed on the basis of whether or not the information on the MCS index is included in the header extracted by the header extraction unit 15.

The transmission unit 13 includes, for example, an encoding processing circuit, a modulation circuit, a digital-analog converter (DAC), an upconverter, and a transmission antenna. The transmission unit 13 constitutes a frame transmission unit 13a and an acknowledgment transmission unit 13b.

The frame transmission unit 13a performs a process such as digital modulation or up-conversion on the frame generated by the frame generation unit 12, and then, transmits the frame to the DUT 1 via the transmission antenna.

When the acknowledgment transmission unit 13b establishes the wireless communication connection to the DUT 1, the acknowledgment transmission unit 13b outputs an ACK frame to the DUT 1 each time the reception unit 14 receives the frame transmitted from the DUT 1.

Further, when the frame received from the DUT after the wireless communication connection measured, the acknowledgment transmission unit 13b transmits an ACK frame to the DUT 1 only when the determination unit 16 has determined that the header has been normally received by the reception unit 14.

Thus, since the acknowledgment transmission unit 13b transmits the ACK frame when the header has been normally received by the reception unit 14 regardless of the presence or absence of a reception error of a data body with a high data rate in the reception unit 14, a high transmission data rate of the DUT 1 that is a transmission source can be maintained.

A frame that the reception unit 14 receives for measurement from the DUT 1 is a frame conforming to the IEEE 802.11 standard and is, for example, a ping reply frame (response frame) or an ACK frame (an acknowledgment frame) that the DUT 1 transmits in response to a ping request frame when the frame transmission unit 13a has transmitted the ping request frame to the DUT 1 according to a ping command. Alternatively, a frame that the reception unit 14 receives from the DUT 1 may be a frame including data with a pulse pattern such as a pseudo random bit sequence.

For example, ping data is included in the data portion of the ping reply frame. The ping data includes data of a ping command, and data for transmission characteristics measurement. For example, the data for transmission characteristics measurement includes a data pattern such as "0000 . . . ", "0101 . . . ", and "1010 . . . ", and is data set by a user for measurement of predetermined transmission characteristics. Using the data pattern, the measurement device 10 can specify a data pattern in which it is easy for an error occur in transmission characteristics evaluation of the DUT 1.

The measurement unit 17 performs measurement regarding transmission characteristics of the DUT 1 with respect to the frame determined by the determination unit 16 that the header has been normally received by the reception unit 14. Specifically, the measurement unit 17 can measure, for example, transmission power, error vector amplitude (EVM), constellation, spectrum, or the like as the transmission characteristics of the DUT 1.

Even when a reception error occurs in the data portion with the high data rate in the reception unit 14, the measurement unit 17 can require a relatively long time for an analysis process, and therefore, the transmission characteristics can be measured in some cases.

The display unit 18 includes, for example, a display device such as an LCD (Liquid Crystal Display) or a CRT (Cathode Ray Tube). The display unit 18 displays various types of display content such as a measurement result of the transmission characteristics of the DUT 1 by the measurement unit 17 or a determination result of the determination unit 16 according to a control signal from the control unit 20. Further, the display unit 18 performs a display of manipulation targets such as soft keys, pull-down menus, and text boxes for setting various conditions.

The manipulation unit 19 is for receiving a manipulation input from the user, and is configured of, for example, a touch panel provided on a surface of a display screen of the display unit 18. Alternatively, the manipulation unit 19 may include an input device such as a keyboard or a mouse. Further, the manipulation unit 19 may be configured by an external control device that performs remote control using a remote command or the like.

A manipulation input to the manipulation unit 19 is detected by the control unit 20. For example, using the manipulation unit 19, the user can designate a type of transmission characteristics measurement to be executed by the measurement unit 17.

The control unit 20 is configured of, for example, a microcomputer, a personal computer, or the like including a CPU (Central Processing Unit), a ROM (Read Only Memory), a RAM (Random Access Memory), an HDD (Hard Disk Drive), and the like, and controls an operation of each unit constituting the measurement device 10.

The transmission data generation unit 11, the frame generation unit 12, the header extraction unit 15, the determination unit 16, and the measurement unit 17 can be configured of a digital circuit such as a field programmable gate array (FPGA) or an application specific integrated circuit (ASIC) or can be configured in software by the control unit 20 executing a predetermined program. Alternatively, the transmission data generation unit 11, the frame generation unit 12, the header extraction unit 15, the determination unit 16, and the measurement unit 17 can be configured of an appropriate combination of hardware processing using a digital circuit and software processing using a predetermined program.

Figure 5:
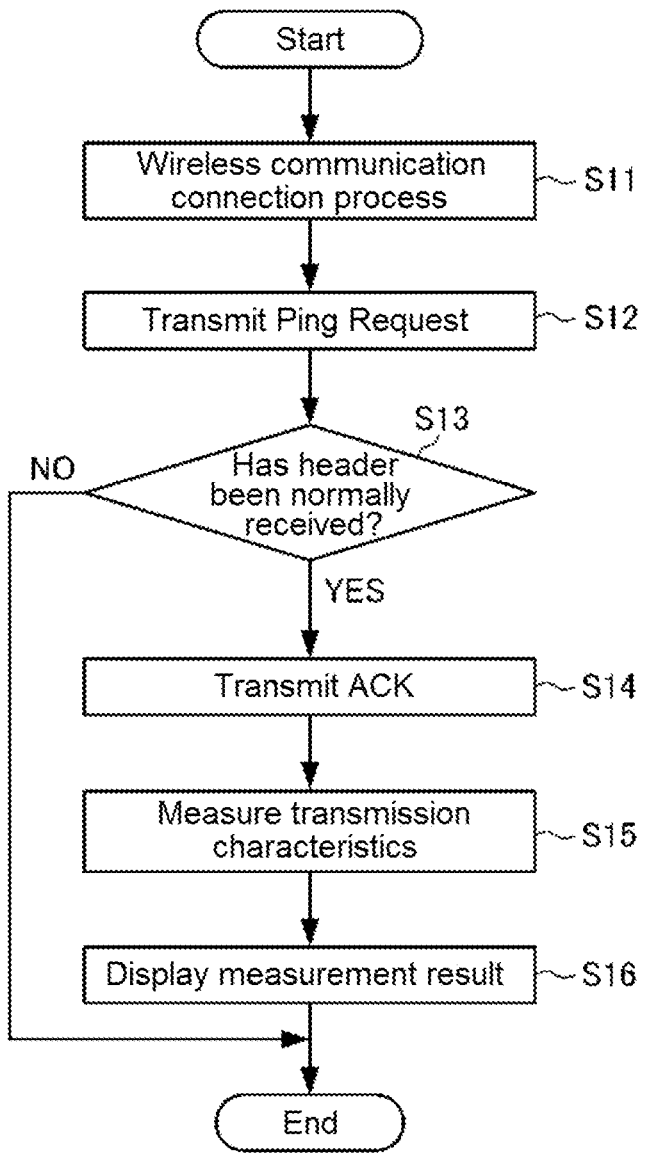
FIG. 5 is a flowchart illustrating a process of a measurement method using the measurement device according to the first embodiment of the present invention.

Hereinafter, an example of a measurement method using the measurement device 10 of the first embodiment will be described with reference to a flowchart of FIG. 5. Here, a process of maintaining a maximum data rate when the data rate of the frame transmitted from the DUT 1 is the maximum data rate in an initial state will be described. A maximum value of the MCS index giving the maximum data rate is 7 in the case of the HT and 9 in the case of the VHT. In addition, here, it is assumed that a frame that the reception unit 14 receives for measurement from the DUT 1 is a ping reply frame.

First, the transmission unit 13 and the reception unit 14 perform a wireless communication connection process including a process of establishing communication connection to the DUT 1 on the basis of a communication standard conforming to any one of IEEE 802.11 a/b/g/n/ac with the DUT 1 (step S11).

Then, the frame transmission unit 13a transmits a ping request frame to the DUT 1 (step S12).

Then, the determination unit 16 determines whether or not a header of a ping reply frame transmitted from the DUT 1 has been normally received by the reception unit 14 (a determination step S13).

When it is not determined in step S13 that the header of the ping reply frame has been normally received by the reception unit 14 even when a predetermined time has elapsed, the control unit 20 ends the process.

On the other hand, when it is determined in step S13 that the header of the ping reply frame has been normally received by the reception unit 14, the frame transmission unit 13a transmits an ACK frame as an acknowledgment frame to the DUT 1 (an acknowledgment transmission step S14).

Then, the measurement unit 17 performs measurement regarding transmission characteristics of the DUT on the ping reply frame of which the header has been determined in step S13 to have been normally received by the reception unit 14 (a measurement step S15).

Then, the display unit 18 displays the measurement result of the measurement unit 17 on a screen (step S16).

Figure 6:
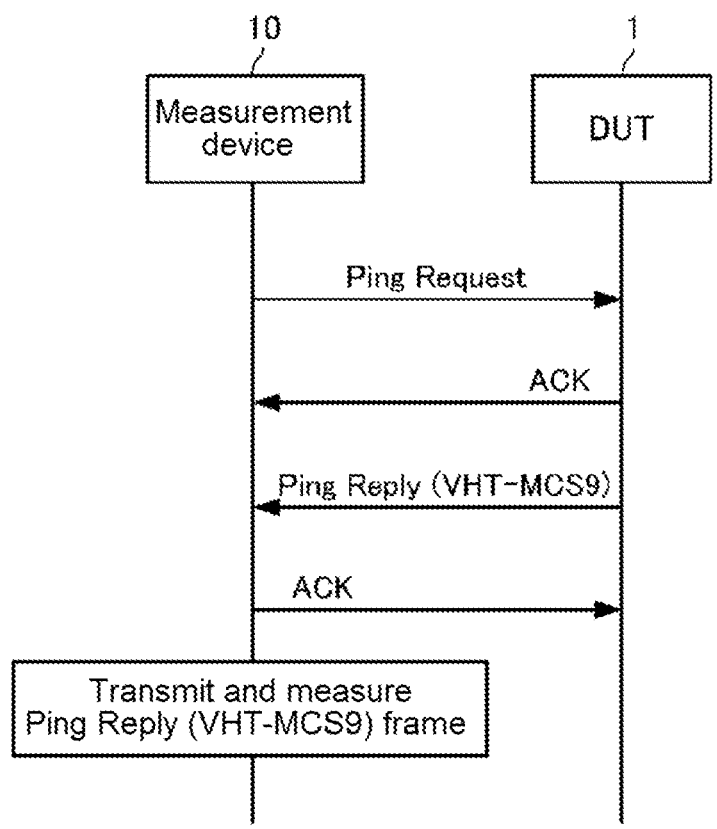
FIG. 6 is a sequence diagram illustrating a process in the flowchart illustrated in FIG. 5.

Next, an example of the frame transmission and reception process in steps S12 to S15 described above will be described in detail with reference to FIG. 6.

The measurement device 10 transmits a ping request frame to the DUT 1. When the DUT 1 receives the ping request frame, the DUT 1 transmits an ACK frame indicating that the DUT 1 has received the ping request frame to the measurement device 10.

Subsequently, the DUT 1 transmits a ping reply frame (for example, VHT-MCS9) responding to the ping request frame to the measurement device 10.

When the measurement device 10 has normally received the header of the ping reply frame (VHT-MCS9) the measurement device 10 transmits the ACK frame to the DUT 1, sets the ping reply frame (VHT-MCS9) as a device under test frame, and measures transmission characteristics.

As described above, since the measurement device 10 according to the first embodiment transmits the ACK frame to the DUT 1 when the header can be normally received even under poor communication conditions such as occurrence of retransmission of a frame from the DUT 1 in the wireless communication connection, it is possible to perform measurement for the DUT 1 while maintaining a desired high data rate.

Further, when the reception unit 14 has received the ping reply frame that the DUT 1 transmits according to the ping command, the measurement device 10 according to the first embodiment can perform the measurement on this ping reply frame.

Further, when the reception unit 14 has received a frame conforming to the IEEE 802.11 standard, the measurement device 10 according to the first embodiment can perform measurement on the frame conforming to the IEEE 802.11 standard.

Further, in the measurement device 10 according to the first embodiment, the measurement unit 17 can measure the transmission characteristics of the DUT 1.

Second Embodiment

Subsequently, a measurement device 30 according to a second embodiment of the present invention will be described with reference to the drawings. The same configurations as those of the first embodiment are denoted by the same reference numerals, and description thereof will be omitted as appropriate. In addition, description of the same operation as that in the first embodiment will also be omitted as appropriate.

Figure 7:
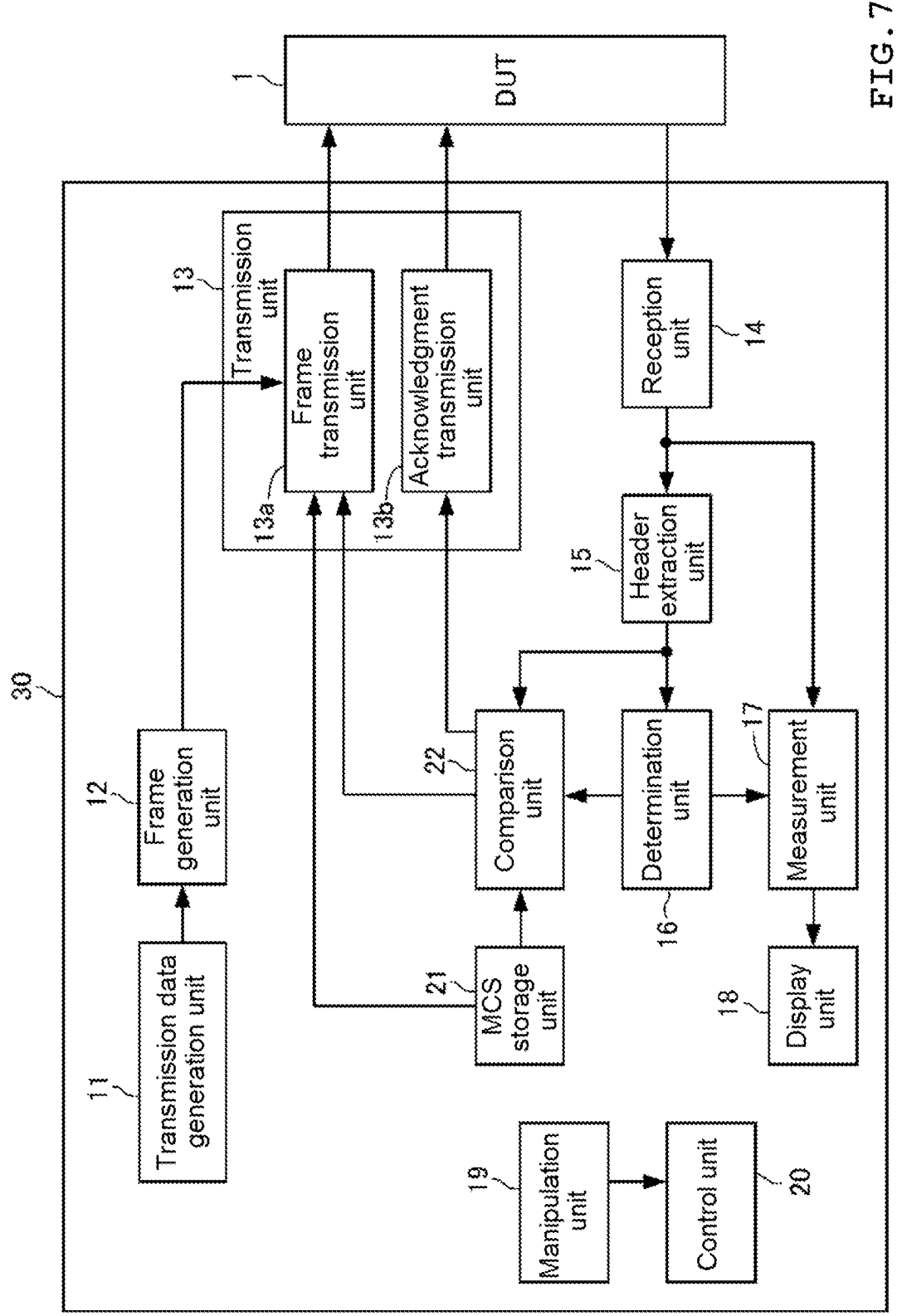
FIG. 7 is a block diagram illustrating a configuration of a measurement device according to a second embodiment of the present invention.

As illustrated in FIG. 7, the measurement device 30 of the second embodiment is different from the measurement device 10 illustrated in FIG. 1 in that the measurement device 30 includes an MCS storage unit 21 and a comparison unit 22.

The MCS storage unit 21 stores the information on the MCS index input by the user manipulating the manipulation unit 19. The MCS storage unit 21 includes, for example, a ROM, a RAM, an HDD, and the like of the control unit 20.

The information on the MCS index stored in the MCS storage unit 21 by the user includes information on an MCS index to be used when the transmission unit 13 and the reception unit 14 establish a wireless communication connection with the DUT 1 (hereinafter referred to as an "MCS index for connection establishment") and information on an MCS index for comparison determined in advance for comparison with an MCS index included in the frame that the reception unit 14 has received from the DUT 1 (hereinafter also referred to as a "received MCS index") after the wireless communication connection. The information on the MCS index for connection establishment and the MCS index for comparison are provided to the transmission unit 13 and the comparison unit 22.

The comparison unit 22 compares the MCS index for comparison stored in the MCS storage unit 21 with the reception MCS index included in the header determined by the determination unit 16 to have been normally received by the reception unit 14.

When the comparison unit 22 determines that the received NCS index is less than the MCS index for comparison, the comparison unit 22 output a less-than-predetermined value signal indicating that the received MCS index is less than the MCS index for comparison to the acknowledgment transmission unit 13b. When the comparison unit 22 determines that the received MCS index exceeds the MCS index for comparison, the comparison unit 22 outputs a predetermined value excess signal indicating that the received MCS index exceeds the MCS index for comparison to the acknowledgment transmission unit 13b.

Further, when the comparison unit 22 determines that the received MCS index matches the MCS index for comparison, the comparison unit 22 outputs an MCS index matching signal indicating that the received MCS index matches the MCS index for comparison to the acknowledgment transmission unit 13b.

The comparison unit 22 can be configured of a digital circuit such as a field programmable gate array (FPGA) or an application specific integrated circuit (ASIC) or can be configured in software by the control unit 20 executing a predetermined program. Alternatively, the comparison unit 22 can be configured of an appropriate combination of hardware processing using a digital circuit and software processing using a predetermined program.

When the acknowledgment transmission unit 13b establishes a wireless communication connection with the DUT 1, the acknowledgment transmission unit 13b outputs an ACK frame to the DUT 1 each time the reception unit 14 receives a frame transmitted from the DUT 1, similar to the first embodiment.

When the frame received from the DUT after the wireless communication connection is measured, the acknowledgment transmission unit transmission unit 13b transmits the ACK frame to the DUT 1 only in a case where it is determined by the comparison unit 22 that the received MCS index is equal to or smaller than the MCS index for comparison, that is, a case where the less-than-predetermined value signal or the MCS index matching signal is input from the comparison unit 22.

On the other hand, when it is not determined by the comparison unit 22 that the received MCS index is equal to or less than the MCS index for comparison, that is, when the predetermined value excess signal is input from the comparison unit 22, the acknowledgment transmission unit 13b transmits the ACK frame to the DUT 1.

When the comparison unit 22 determines that the received MCS index is less than the MCS index for comparison, that is, when a less-than-predetermined value signal is input from the comparison unit 22, the frame transmission unit 13a serving as a request signal transmission unit transmits a frame request signal for requesting a frame to the DUT 1. The frame request signal is, for example, a ping request frame.

The measurement unit 17 is configured to perform measurement of the transmission characteristics of the DUT 1 with respect to the frame determined by the comparison unit 22 that the received MCS index matches the MCS index for comparison.

Figure 8:
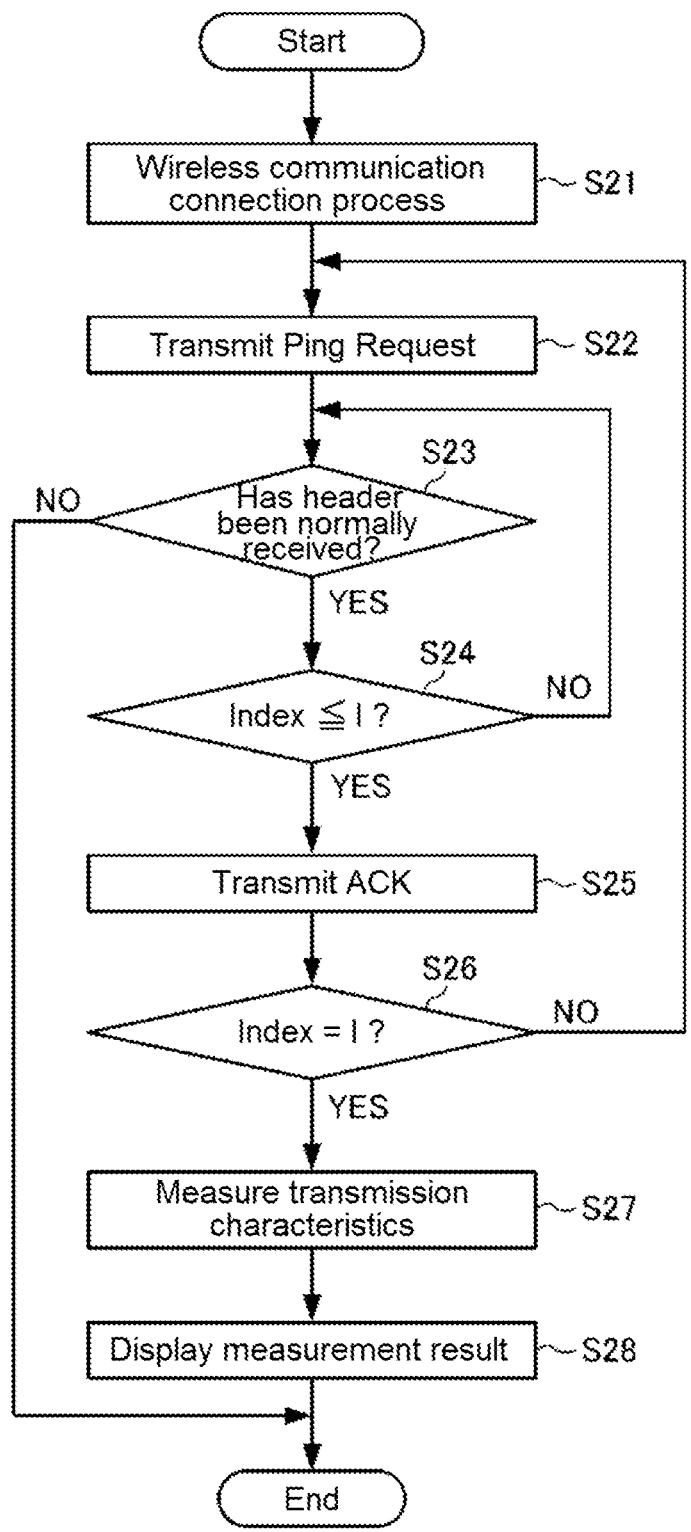
FIG. 8 is a flowchart illustrating a process of a measurement method using the measurement device according to the second embodiment of the present invention.

Hereinafter, an example of a process of the measurement method using the measurement device 30 of the second embodiment will be described with reference to the flowchart of FIG. 8. Here, a process of maintaining an MCS index of a frame transmitted from the DUT 1 at a desired value I will be described.

First, the transmission unit 13 and the reception unit 14 perform a wireless communication connection process including a process of establishing a communication connection to the DUT 1 on the basis of a communication standard conforming to any one of IEEE 802.11n/ac (step S21). In the wireless communication connection process, the transmission unit 13 can notify the DUT 1 of the MCS index for connection establishment stored in the MCS storage unit 21, and the reception unit 14 can receive a frame generated on the basis of the MCS index for connection establishment from the DUT 1. The MCS index for connection establishment and the MCS index for comparison may be the same.

Then, the frame transmission unit 13a transmits a ping request frame (a frame request signal) to the DUT 1 (a request signal transmission step S22).

The determination unit 16 determines whether or not a header of a ping reply frame transmitted from the DUT 1 has been normally received by the reception unit 14 (a determination step S23).

When it is not determined in step S23 that the header of the ping reply frame has been normally received by the reception unit 14 even when a predetermined time has elapsed, the control unit 20 ends the process.

On the other hand, when it is determined in step S23 that the header of the ping reply frame has been normally received by the reception unit 14, the comparison unit 22 determines whether or not the received MCS index included in the header is equal to or less than I (the MCS index for comparison) (a comparison step S24).

When it is not determined in step S24 that the received MCS index is equal to or less than I, the comparison unit 22 outputs a predetermined value excess signal to the acknowledgment transmission unit 13b, and the process returns to step S23. That is, the transmission unit 13 does not transmit the ACK frame indicating that the frame has been received, to the DUT 1.

On the other hand, when it is determined in step S24 that the received MCS index is equal to or less than I, the comparison unit 22 outputs the less-than-predetermined value signal or the MCS index matching signal to the acknowledgment transmission unit 13b, and the transmission unit 13 transmits the ACK frame to the DUT 1 (step S25).

Then, the comparison unit 22 determines whether or not the received MCS index is I (comparison step S26). That is, the comparison unit 22 determines whether or not the received ping reply frame is a device under test.

When it is not determined in step S26 that the received MCS index is I, that is, when the received MCS index is less than I, the process returns to step S22. That is, the frame transmission unit 13a transmits a ping request frame (a frame request signal) to the OUT 1 until the reception unit 14 receives a frame of which the reception MCS index is I. In step S26, when a desired received MCS index cannot be received for a preset predetermined time, a process of causing transmission measurement to be timeout may be ended.

On the other hand, when it is determined in step S26 that the received MCS index matches I, the measurement unit 17 performs measurement regarding transmission characteristics of the DUT 1 on the ping reply frame of which the received MCS index is determined in step S26 to be I (a measurement step S27).

Then, the display unit 18 displays the measurement result of the measurement unit 17 on a screen (step S28).

Figure 9:
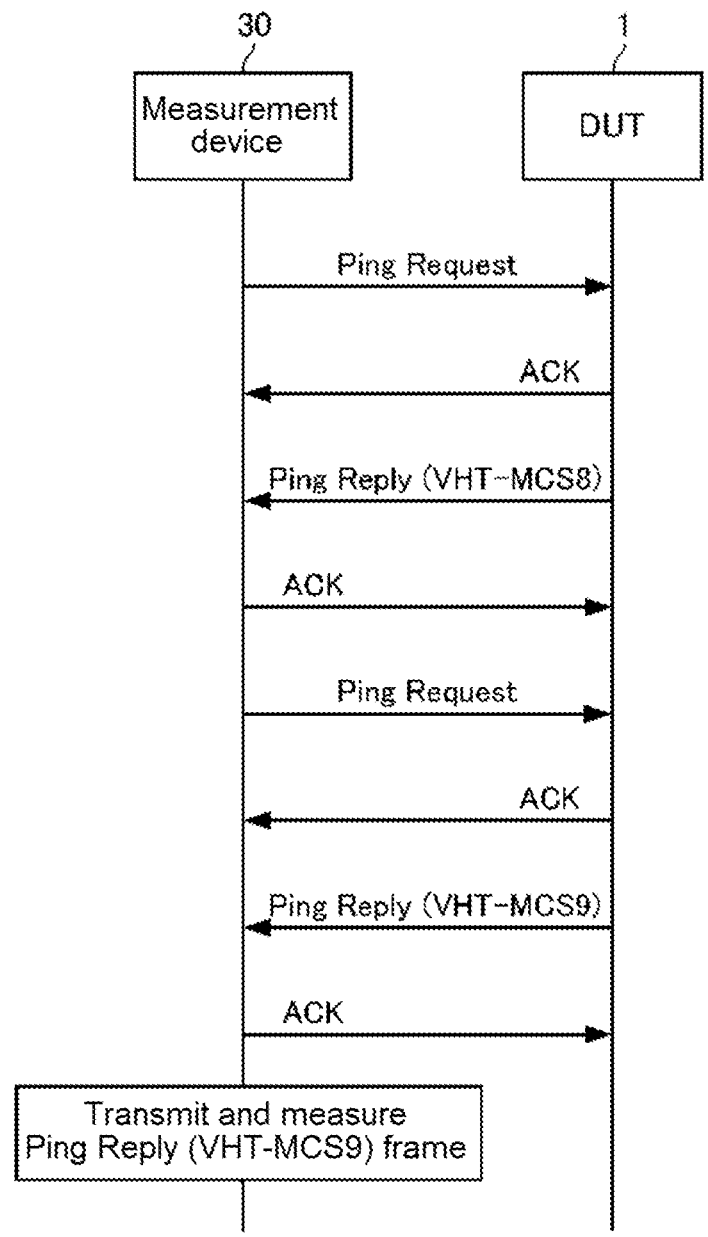
FIG. 9 is a sequence diagram illustrating a process in the flowchart illustrated in FIG. 8.

Then, an example of the frame transmission and reception process in steps S22 to S27 described above will be described in detail with reference to FIG. 9.

The measurement device 30 transmits a ping request frame to the DUT 1. When the DUT 1 receives the ping request frame, the DUT 1 transmits an ACK frame indicating that the DUT 1 has received the ping request frame to the measurement device 30.

Subsequently, the DUT 1 transmits a ping reply frame (for example, VHT-MCS8) responding to the ping request frame to the measurement device 30.

Subsequently, when the measurement device 30 normally receives the header of the ping reply frame and the received MCS index of the frame is less than the desired value I, the measurement device 30 transmits the ACK frame and the ping request frame to the DUT 1. Here, it is assumed that the desired value I is, for example, 9.

Subsequently, the DUT 1 retransmits the ping reply frame (for example, VHT-MCS9). Since the measurement device 30 normally receives the header of the ping reply frame (VHT-MCS9) and the received MCS index of the frame is the desired value I, the measurement device 30 transmits the ACK frame to the DUT 1, sets the ping reply frame (VHT-MCS9) as a device under test frame, and measures the transmission characteristics.

As described above, since the measurement device 30 according to the second embodiment transmits the ACK frame to the DUT 1 according to a comparison result of the comparison unit 22 when the header can be normally received even under poor communication conditions such as occurrence of retransmission of a frame from the DUT 1 in the wireless communication connection, it is possible to perform measurement for the DUT 1 while maintaining a desired high data rate.

Further, when the reception unit 14 has received the ping reply frame that the DUT 1 transmits according to the ping command, the measurement device 30 according to the second embodiment can perform the measurement on this ping reply frame.

Further, when the reception unit 14 has received a frame conforming to the IEEE 802.11 standard, the measurement device 30 according to the second embodiment can perform measurement on the frame conforming to the IEEE 802.11 standard.

Further, in the measurement device 30 according to the second embodiment, the measurement unit 17 can measure the transmission characteristics of the DUT 1.

DESCRIPTION OF REFERENCE NUMERALS AND SIGNS

1: DUT
10, 30: measurement device
11: transmission data generation unit
12: frame generation unit
13: transmission unit
13a: frame transmission unit
13b: acknowledgment transmission unit
14: reception unit
15: header extraction unit
16: determination unit
17: measurement unit
18: display unit
19: manipulation unit
20: control unit
21: NCS storage unit
22: comparison unit

What is claimed is:

1. A measurement device which includes
a reception unit that receives a frame or a changed frame transmitted by a device under test;
a measurement unit that performs measurement on the frame or the changed frame received by the reception unit, the device under test retransmitting a frame in which at least one of predetermined modulation scheme and predetermined coding rate has been changed so that a data rate is lower than that of a frame generated using the modulation scheme and the predetermined coding rate, in order to measure the device under test when an acknowledgment frame indicating that a predetermined transmission destination has received the frame has not been received after the frame is transmitted to the transmission destination;
a determination unit that determines whether or not a header of the frame or the changed frame has been normally received by the reception unit;
an acknowledgment transmission unit that transmits the acknowledgment frame to the device under test when the determination unit determines that the header has been normally received by the reception unit,
wherein the measurement unit performs the measurement on the frame or the changed frame determined by the determination unit that the header has been normally received by the reception unit;
a comparison unit that compares the modulation and coding scheme index included in the header determined by the determination unit to have been normally received by the reception unit with a predetermined value,
wherein the acknowledgment transmission unit transmits the acknowledgment frame to the device under test when the comparison unit determines that the modulation and coding scheme index is equal to or less than a predetermined value, and does not transmit the acknowledgment frame to the device under test when the comparison unit does not determine that the modulation and coding scheme index is equal to or less than the predetermined value,
a request signal transmission unit transmits a frame request signal to the device under test when it is determined by the comparison unit that the modulation and coding scheme index is less than the predetermined value, and
the measurement unit performs the measurement on the frame or the changed frame determined by the comparison unit that the modulation and coding scheme index matches the predetermined value.

2. The measurement device according to claim 1, wherein the reception unit receives, as the frame or the changed frame, a response frame that the device under test transmits according to a ping command.

3. The measurement device according to claim 1, wherein the reception unit receives a frame conforming to the IEEE 802.11 standard as the frame or the changed frame.

4. A measurement method of performing measurement on the device under test using the measurement device according to claim 1, the method comprising:
a determination step of determining whether or not a header of the frame or the changed frame transmitted by the device under test has been normally received by the reception unit;
an acknowledgment transmission step of transmitting the acknowledgment frame to the device under test when it is determined in the determination step that the header has been normally received by the reception unit; and
a measurement step of performing the measurement on the frame or the changed frame determined in the determination step that the header has been normally received by the reception unit.

5. The measurement method according to claim 4, wherein the reception unit receives, as the frame or the changed frame, a response frame that the device under test transmits according to a ping command.

6. The measurement method according to claim 4, wherein a frame conforming to the IEEE 802.11 standard is received as the frame or the changed frame.

7. The measurement method according to claim 4, wherein transmission characteristics of the device under test are measured.

8. A measurement method of performing measurement on the device under test using the measurement device according to claim 1, the method comprising:
- a determination step of determining whether or not a header of the frame or the changed frame transmitted by the device under test has been normally received by the reception unit;
- a comparison step of comparing the modulation and coding scheme index included in the header determined in the determination step to have been normally received by the reception unit with a predetermined value;
- an acknowledgment transmission step of transmitting the acknowledgment frame to the device under test when it is determined in the comparison step that the modulation and coding scheme index is equal to or less than a predetermined value, and not transmitting the acknowledgment frame to the device under test when it is not determined in the comparison step that the modulation and coding scheme index is equal to or less than the predetermined value;
- a request signal transmission step of transmitting the frame request signal to the device under test when it is determined in the comparison step that the modulation and coding scheme index is less than the predetermined value; and
- a measurement step of performing the measurement on the frame or the changed frame determined in the comparison step that the modulation and coding scheme index matches the predetermined value.

* * * * *